US011551239B2

(12) United States Patent
Jain et al.

(10) Patent No.: US 11,551,239 B2
(45) Date of Patent: Jan. 10, 2023

(54) CHARACTERIZING AND MODIFYING USER EXPERIENCE OF COMPUTING ENVIRONMENTS BASED ON BEHAVIOR LOGS

(71) Applicant: Adobe Inc., San Jose, CA (US)

(72) Inventors: Deepali Jain, Bellandur (IN); Atanu R. Sinha, Bangalore (IN); Deepali Gupta, Paharganj (IN); Nikhil Sheoran, Chandigarh (IN); Sopan Khosla, Bangalore (IN); Reshmi Naduparambil Sasidharan, Trichur (IN)

(73) Assignee: Adobe Inc., San Jose, CA (US)

( * ) Notice: Subject to any disclaimer, the term of this patent is extended or adjusted under 35 U.S.C. 154(b) by 531 days.

(21) Appl. No.: 16/162,023

(22) Filed: Oct. 16, 2018

(65) Prior Publication Data

US 2020/0118145 A1    Apr. 16, 2020

(51) Int. Cl.

| G06Q 30/02 | (2012.01) |
|---|---|
| G06Q 30/00 | (2012.01) |
| G06F 17/18 | (2006.01) |
| G06F 3/0484 | (2022.01) |

(52) U.S. Cl.
CPC ............ *G06Q 30/02* (2013.01); *G06F 17/18* (2013.01); *G06Q 30/01* (2013.01); *G06F 3/0484* (2013.01)

(58) Field of Classification Search
None
See application file for complete search history.

(56) References Cited

U.S. PATENT DOCUMENTS

| 9,367,524 | B1* | 6/2016 | Filev | G06Q 30/0277 |
|---|---|---|---|---|
| 2009/0164395 | A1* | 6/2009 | Heck | G06F 16/954 |
| | | | | 706/16 |
| 2011/0153377 | A1* | 6/2011 | Novikov | G06Q 50/01 |
| | | | | 705/7.11 |
| 2013/0132874 | A1* | 5/2013 | He | G06F 3/04817 |
| | | | | 715/765 |

(Continued)

OTHER PUBLICATIONS

"Least squares." The Concise Oxford Dictionary of Mathematics (5 ed.), ed. by Christopher Clapham and James Nicholson, Oxford University Press, 2014. (Year: 2014).*

(Continued)

*Primary Examiner* — Mehmet Yesildag
(74) *Attorney, Agent, or Firm* — FIG. 1 Patents

(57) ABSTRACT

There is described a method and system in an interactive computing environment modified with user experience values based on behavior logs. An experience valuation system determines an experience value and an estimated experience value. The experience value is based on a current state of interaction data from a user session, based on a history of past events, and an estimation function defined by parameters to model the user experience values. The estimated experience value is determined based on, in addition to the current state and the estimation function, next states associated with the current state, and a reward function. The parameters of the estimation function are updated based on a comparison of the expected experience value and the estimated experience value. For another aspect, the method and system may further include a state prediction system to determine probabilities of transitioning that may be applied to determine the estimated experience value.

20 Claims, 8 Drawing Sheets

(56) References Cited

U.S. PATENT DOCUMENTS

| | | | | |
|---|---|---|---|---|
| 2013/0288222 | A1* | 10/2013 | Stacy | G09B 7/00 434/362 |
| 2014/0195475 | A1* | 7/2014 | Levchuk | G06Q 50/20 706/52 |
| 2015/0262205 | A1* | 9/2015 | Theocharous | G06Q 10/067 705/7.31 |
| 2015/0269609 | A1* | 9/2015 | Mehanian | G06Q 30/0246 705/14.45 |
| 2016/0078456 | A1* | 3/2016 | Chakraborty | G06Q 30/0204 705/7.31 |
| 2016/0342911 | A1* | 11/2016 | Kannan | G06Q 30/01 |
| 2018/0342004 | A1* | 11/2018 | Yom-Tov | G06N 7/08 |

OTHER PUBLICATIONS

Weisstein, E.W. "Least Squares Fitting." MathWorld—A Wolfram Web Resource. Accessed Sep. 21, 2020, <http://mathworld.wolfram.com/LeastSquaresFitting.html>. Web Archive, Jun. 4, 2011, <http.web.archive.org/web/20110604014557/https://mathworld.wolfram.com/LeastSquaresFitting.html>. (Year: 2011).*

Geramifard, A., Bowling, M., Sutton, R. "Incremental Least-Squares Temporal Difference Learning." 21st AAAI Conference on Artificial Intelligence, Jul. 16-20, 2006, Boston, Massachusetts, ed. by Yolanda Gil and Raymond J. Mooney, AAAI Press, 2006, pp. 356-361. (Year: 2006).*

Geist, M., Scherrer, B. "$\ell$ 1-Penalized Projected Bellman Residual." 9th European Workshop on Recent Advances in Reinforcement Learning, Sep. 9-11, 2011, Athens, Greece, ed. by Scott Sanner and Marcus Hutter, Springer, 2012, pp. 89-101. (Year: 2012).*

Derhami, V., et al. "Applying reinforcement learning for web pages ranking algorithms." Applied Soft Computing, vol. 13, is. 4, Apr. 2013, pp. 1686-1692. (Year: 2013).*

Liu, E.Z., et al. "Reinforcement Learning on Web Interfaces using Workflow-guided Exploration." ILCR 2018: 6th International Conference on Learning Representations, Apr. 30-May 3, 2018. (Year: 2018).*

"Customer Experience in 2020—CISCO", Retrieved at: https://www.cisco.com/c/dam/en/us/solutions/collateral/digital-transformation/customer-experience/cx2020-whitepaper.pdf.—on Jun. 19, 2018, 17 pages.

"CX Index—Forrester", Retrieved at: https://go.forrester.com/analytics/cx-index/, 6 pages.

"The American Customer Satisfaction Index", Retrieved at: http://www.theacsi.org/, on Jun. 19, 2018, 2 pages.

Anderson,"Relational Markov Models and their Application to Adaptive Web Navigation", KDD '02 Proceedings of the eighth ACM SIGKDD international conference on Knowledge discovery and data mining, Jul. 2002, 10 pages.

Balakrishnan,"Predicting Student Retention in Massive Open Online Courses using Hidden Markov Models", Electrical Engineering and Computer Sciences University of California at Berkeley, 2013., May 17, 2013, 13 pages.

Chylinski,"Experience Infusion: Howto Improve Customer Experience with Incidental Activities", Retrieved at: http://www.msi.org/reports/experience-infusion-how-to-improve-customer-experience-with-incidental-activities/—on Jun. 19, 2018, 2 pages.

Hochreiter,"Long Short-Term Memory", In Neural computation, 1997, Nov. 15, 1997, 32 pages.

Kim,"Modeling Dwell Time to Predict Click-level Satisfaction", In Proceedings of the 7th ACM International Conference on Web Search and Data Mining, WSDM '14, Feb. 24, 2014, 10 pages.

Kingma,"Adam: A Method for Stochastic Optimization", Jan. 30, 2017, 15 pages.

Kivetz,"The Goal-Gradient Hypothesis Resurrected: Purchase Acceleration, Illusionary Goal Progress, and Customer Retention", Journal of Marketing Research, 43(1):39{58,, Feb. 2006, pp. 39-58.

Korpusik,"Recurrent Neural Networks for Customer Purchase Prediction on Twitter", Sep. 16, 2016, 4 pages.

Lang,"Understanding Consumer Behavior with Recurrent Neural Networks", International Workshop on Machine Learning Methods for Recommender Systems, 2017., Nov. 2017, 8 pages.

Lemon,"Understanding Customer Experience Throughout the Customer Journey", Journal of Marketing, Nov. 2016, 29 pages.

Liu,"Patterns and Sequences: Interactive Exploration of Clickstreams to Understand Common Visitor Paths", IEEE Transactions on Visualization and Computer Graphics, 23(1):321{330, Jan. 2017, 10 pages.

Novak,"The Influence of Goal-Directed and Experiential Activities on Online Flow Experiences", Journal of Consumer Psychology, 13(1):3 { 16, 2003., Jan. 2003, 15 pages.

Odijk,"Struggling and Success in Web Search", In Proceedings of the 24th ACM International on Conference on Information and Knowledge Management, Oct. 1, 2015, 10 pages.

Wang,"Modeling Action-level Satisfaction for Search Task Satisfaction Prediction", In Proceedings of the 37th international ACM SIGIR conference on Research & development in information retrieval, Jul. 3, 2014, 10 pages.

Ypms,"Automatic categorization of web pages and user clustering with mixtures of hidden Markov models", In International Workshop on Mining Web Data for Discovering Usage Patterns and Profiles, Jul. 2002, 15 pages.

Yu,"On Generalized Bellman Equations and Temporal-Difference Learning", In Canadian Conference on Artificial Intelligence, Apr. 14, 2017, 35 pages.

Zhang,"Sequential Click Prediction for Sponsored Search with Recurrent Neural Networks", Apr. 23, 2014, pp. 1369-1375.

* cited by examiner

CHARACTERIZING AND MODIFYING USER EXPERIENCE OF COMPUTING ENVIRONMENTS BASED ON BEHAVIOR LOGS

BACKGROUND

Interactive computing environments provide users with the ability to interact in real-time with computing devices, often to perform specific tasks. Examples of interactive computing environments include e-commerce applications, web-based applications, and other online computing platforms, to include cloud-based services, that allow users to perform various computer-implemented functions through user interfaces of computing devices. Users may have positive experiences, negative experiences, or a combination of experiences when interacting with computing devices.

Many businesses have a strong interest in analyzing the interactive computing environments of their existing and potential consumers to create a positive experience for each consumer. For interactive computing environments associated with businesses, consumer experience is an important metric for creating the positive experience. For example, a consumer may conduct searches, apply filters or preferences, and make selections at an online computing platform associated with a particular business. The consumer's experience when conducting these types of tasks may impact his or her opinion of the platform and/or business. Thus, businesses have an interest in modifying the online computing platform based on these events to improve future consumer experiences.

Conventional techniques are limited in their ability to customize interactive computing environments based on consumer experiences. Each business may measure consumer experience at an individual level by requesting a user to respond to a survey, online and offline, after the interactions with an online computing environment. However, most users do not respond to requests for feedback, thus resulting in very low response rates. Also, the responses from survey-based tools often have low reliability due to the nature of latent, and somewhat biased, consumer reactions, and it can be difficult to correlate a user survey or rating response to a specific interaction. Accordingly, the usefulness of the user responses is limited due to the fact that the responses are conditioned on the questions and provide only a snapshot of the entire consumer experience.

SUMMARY

User experience evaluation techniques are described for collecting information associated with a user's interaction with an online platform, evaluating the collected information to determine user experience values, and providing guidance to the online platform based on the user experience values to improve future user experiences. For example, the techniques may collect click actions or events in a behavior log associated with the user to measure the user's interaction with the online platform. In contrast to the survey approach, each and every event of the user's interaction may be collected, without requiring any additional effort on the part of the user. Further, experience values can be assessed for every user event, and user interaction information is measured unobtrusively from abundantly available clickstream data, which is more attractive that the obtrusive approach of issuing surveys to users.

The user experience evaluation techniques provide advantages over conventional techniques by measuring user experience from interaction data. The resulting user experience values represent user behavior on online platforms, which is more reliable than survey responses and likely more accurate. For one advantage, the user experience values are determined by events or actions at an individual user level, consistent with long-view online behaviors. In addition, a decision theoretic framework, Partially Observable Markov Decision Process (POMDP), is used to represent browsing behaviors, thus maximizing the overall reward from each entire journey. The decisions by each user are conditional on rewards of past actions and expectations of future rewards, recognizing that the user learns from current actions and may change future actions in view of what has been learned. The POMDP is also used for representing partially observable states and measuring latent experiences in the journeys of users. The user experience evaluation techniques further provide a flexible framework that may extend to different types of reward structures and multiple goals of users. The above advantages distinguish the user experience evaluation techniques from conventional approaches.

One aspect is model-based in an interactive computing environment characterized by user experience values based on behavior logs, implemented by a state prediction system and an experience valuation system. Interaction data for a user session is received from a remote system. The state prediction system determines probabilities of transitioning from a current state to multiple next states based on the interaction data. The experience valuation system determines an expected experience value and an estimated experience value. The expected experience value is determined based on the current state of the interaction data and an estimation function defined by a set of parameters to model the user experience values. The estimated experience value is determined based on similar information (i.e., the current state and the estimation function) and, in addition, multiple next states associated with the current state, a reward function including multiple reward values associated with transitioning from the current state to the multiple next states, and the probabilities of transitioning determined by the state prediction system. The set of parameters of the estimation function are updated based on a comparison of the expected experience value and the estimated experience value. Thereafter, the user experience values are transmitted to the remote system.

Another aspect is a method that implements an experience valuation system utilizing a model-free approach to the value iteration method, in contrast to the model-based approach for value iteration described above. Similar to the model-based approach, the experience valuation system for the model-free approach determines an expected experience value and an estimated experience value, and the expected experience value is determined based on the current state of the interaction data and an estimation function defined by a set of parameters to model the user experience values. On the other hand, the estimated experience value is determined without the probabilities of transitioning, i.e., the determination is based on the current state, multiple next states associated with the current state, the estimation function, and a reward function including multiple reward values associated with transitioning from the current state to the multiple next states. The set of parameters of the estimation function are updated based on a comparison of the expected experience value and the estimated experience value, and the user experience values are transmitted to the remote system.

Yet another aspect is a system in an interactive computing environment characterized by user experience values based on behavior logs. For the system, an experience valuation system is implemented to determine an expected experience value, determine an estimated experience value, and update a set of parameters of the estimation function based on a comparison of the expected experience value and the estimated experience value effective to modify a user experience of the interactive computing environment. The expected experience value is based on a current state of interaction data and an estimation function defined by the set of parameters to model the user experience values. The estimated experience value is based on the current state, a next state associated with the current state, the estimation function, and a reward function including a reward associated with transitioning from the current state to the next state.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
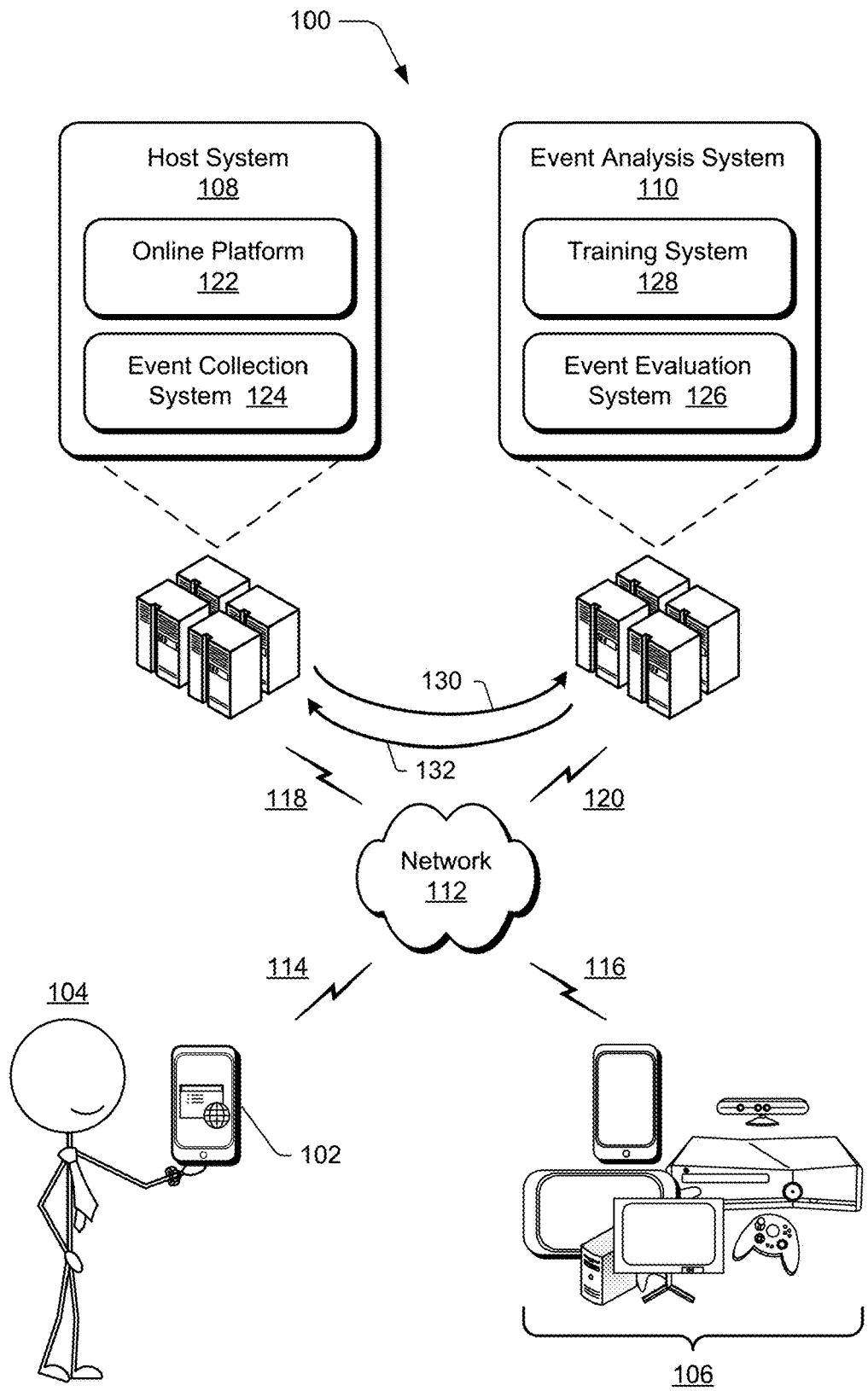
FIG. 1 is an illustration of an interactive computing environment in an example implementation that is operable to employ user experience evaluation techniques described herein.

While the present invention is susceptible of embodiment in various forms, there is shown in the drawings and described herein, embodiments with the understanding that the present disclosure is to be considered an exemplification of an invention that is not limited to the specific embodiments described and illustrated. One skilled in the art will hopefully appreciate that elements in the figures are illustrated for simplicity and clarity and have not necessarily been drawn to scale. For example, the dimensions of some of the elements in the figures may be exaggerated relative to other elements with the intent to help improve understanding of the aspects of the embodiments being illustrated and described.

The user experience evaluation techniques described herein determine user experience values to enhance interactive user experiences at the online platforms of interactive computing environments. The user experience values may be determined based on the behavior logs of users, such as click actions, tracked by a host system of an online platform. Proxy ratings can be determined from clickstream data, such as collected for user's online interactions. By analyzing user interactions that occur within the interactive computing environment, behavior logs may be collected unobtrusively from abundantly available clickstream data, which is more attractive than the obtrusive method of issuing surveys currently in use by conventional techniques.

Generally, users are decision oriented in their browsing behaviors and look toward the future, focusing on their eventual goals. Users often learn from past actions, and they choose future actions based on these past actions. This "long view" of a user may include successive user sessions where learned information from one session helps a user make decisions about subsequent sessions. In this manner, each user arrives at an online platform with a goal and moves from action-to-action toward completion of the goal. Thus, the user experience evaluation techniques determine user experience values representing fulfillment toward the goal, which yields commensurate rewards.

The user experience values are determined based on behavior information collected at an online platform of an interactive computing environment. The user experience values are determined, without asking questions to users, by combining a recurrent neural network (RNN) with value elicitation from an event sequence. The RNN processes sequential inputs with bidden units to store history of past events. The user experience values are then determined using model-based or model free approaches by drawing from Reinforcement Learning (RL). In one example, a model-based value interaction approach is used. In particular, the user experience values may determine transition probabilities from the behavior information based on a prediction model and determining user experience values based on the transition probabilities. For another example, a model-free approach is data-driven using Temporal Difference (TD) learning. The user experience values may be determined directly from the behavior information by observing the current estimate instead of determining transition probabilities. Once obtained, the user experience values are used to improve future user experiences of the online platform. The proxy ratings are an intuitive customer-level metric, are more useful as a predictor of purchase than customer ratings from a survey, and provide a gauge of the dynamics of ratings over time. The proxy ratings can be computed unobtrusively from clickstream data, for every action for each customer, and for every session, which provides an interpretable and more insightful alternative to surveys.

Interactive Computing Environment

FIG. 1 is an illustration of an interactive computing environment 100 in an example implementation that is operable to employ user experience evaluation techniques described herein. The illustrated environment 100 includes a computing device 102, which may be configured in a variety of ways and operated by a user 104 to generate interactive data. In the same token, the interactive computing environment 100 may include a variety of other devices 106, which may be operated by other users to generate more interaction data.

The computing device 102, as well as the other devices 106, may be any type of computing device that is capable of interacting with one or more users and communicating interaction data over a wired and/or wireless network. The computing device 102 may be described herein without any mention of the other devices 106, but it is to be understood that descriptions for the computing device 102 may equally apply to any of the other devices 106. The computing device 102 may be configured as a desktop computer, a laptop computer, a mobile device (e.g., assuming a handheld configuration such as a tablet or mobile phone as illustrated), computing server, and so forth. Thus, the computing device 102 may range from full resource devices with substantial memory and processor resources (e.g., personal computers, game consoles) to a low-resource device with limited memory and/or processing resources (e.g., mobile devices). Additionally, the computing device 102 (and the other devices 106) may be representative of multiple different devices, such as multiple devices or servers utilized by a business to perform operations "over the cloud" as described in FIG. 9.

As shown in FIG. 1, the interactive computing environment 100 depicts an example of an environment evaluation system to analyze and facilitate modifications to an interactive user experience at the computing device 102. The interactive computing environment 100 also includes systems 108, 110 communicating with the computing device 102 through a network 112. The connections 114-120 to the network 112, as well as within or through the network, may be wired links, wireless links, or a combination of wired and wireless links. The systems included in the interactive computing environment 100 includes a host system 108 communicating with the network 112 via connection 118 and an event analysis system 110 communicating with the network via connection 120. Similar to the computing device 102, the host system 108 and the event analysis system 110 may be any type of computing device that is capable of interacting with one or more computing devices 102, 106 and various types of data over a wired and/or wireless network. Each of the host system 108 and the event analysis system 110 may be configured as a computing server, desktop computer, a laptop computer, a mobile device, and so forth. Thus, the host system 108 and the event analysis system 110 may range from full resource devices with substantial memory and processor resources (e.g., personal computers, game consoles) to a low-resource device with limited memory and/or processing resources (e.g., mobile devices). Again, similar to the computing device 102, each of the host system 108 and the event analysis system 110 may be representative of multiple different devices, such as multiple servers or devices utilized by a business to perform operations "over the cloud" as described in FIG. 9.

As stated above, the interactive computing environment 100 includes the host system 108 and the event analysis system 110. The host system 108 and the event analysis system 110 may communicate with each other over communication channels 130, 132 directly or via the network 112. Interaction data associated with the events or actions of the computing devices 102, 106 may communicated via a first channel 130 from the host system 108 to the event analysis system 110. Experience data, such as user experience values, determined based on the interaction data may be communicated via a second channel 132 from the event analysis system 110 to the host system 108.

The host system 108 may comprise a variety of components including an online platform 122 and an event collection system 124. The online platform 122 is, or is part of, an interactive computing environment hosted by one or more servers that includes various interface elements with which computing devices 102, 106 interact. For example, clicking or otherwise interacting with one or more interface elements during a user session causes the online platform to manipulate electronic content, query electronic content, or otherwise interact with electronic content that is accessible via the online platform. The event collection system 124 is a part of the interactive computing environment, which may or may not be hosted by the same servers as the online platform 122, that extracts interaction data from the online platform for each user session. The interaction data is data generated by one or more user devices interacting with an online platform and/or through software on the devices describes how the user devices interact with the online platform and software. An example of interaction data is clickstream data. Clickstream data may include one or more data strings that describe or otherwise indicate data describing which interface features of an online service were "clicked" or otherwise accessed during a user session. Examples of clickstream data include any consumer interactions on a website, consumer interactions within a local and/or cloud-based software program of a computing device, information from generating a user profile on a website or within a local software program, or any other consumer activity performed in a traceable manner Another example of interaction data includes system-to-system interactions between a user device and server hosting an online platform (e.g., data describing transmission of network addresses, establishing communications, API calls, etc.).

The host system 108 may include one or more servers, such as the event collection system 124, to log user activity in the form of behavior logs at, or for, the online platform 122. The host system 108 may then transmit the interaction data, which includes the behavior logs describing the logged activity, to the event analysis system 110. Additionally, or in the alternative, a computing device 102 may execute one or more services (e.g., a background application) that log user activity for the online platform 122 and transmits the interaction data including the behavior logs to the event analysis system 110.

The event analysis system 110 of the interactive computing environment 100 may comprise a variety of components including an event evaluation system 126. The event evaluation system 126 determines user experience values representing a quality of the interactive user experience for the online platform 122 based on the interaction data received from the event collection system 124 of the host system 108.

The event evaluation system 126 provides the user experience values to the host system 108 so that one or more features of the online platform 122 may be modified to enhance any subsequent interactive user experiences. An example of interaction data includes, but is not limited to, clickstream data representing interface features of the interactive computing environment that have been clicked or otherwise accessed during a user session. The clickstream data may represent user interactions with the computing device 102, data generated as a result of user interactions with the computing device, and/or system-to-system interactions between the computing device 102 and the host system 108 that may not involve user input. Notably, the event evaluation system 126 can implement aspects of utilizing proxy ratings that represent the concept of "surveys without questions" as shown and described with reference to FIG. 8 to develop the proxy ratings from the clickstream data in the form of sequenced user actions during the online user session.

The event analysis system 110 may also include a training system 128 associated with the event evaluation system 126. The training system 128 may be utilized to train the event evaluation system 126. For example, the training system 128 may be effective to improve the ability of the event evaluation system 126 to predict a future event of a user journey. The training system 128 can utilize an amount of training data in order to teach and improve a transition model to the event evaluation system 126. The training system 128 is described in more detail below in reference to FIG. 2.

The event evaluation system 126 of the event analysis system 110 may assist the host system 108 to modify an interactive computing experience by transmitting user experience values to the host system. For example, the host system 108 may cause the layout of an interface at the online platform 122 or the computing device 102 to be rearranged so that features or content associated with higher-quality experience metrics are presented more prominently, and features or content associated with lower-quality experience metrics are presented less prominently. The host system 108 may induce these modifications to be executed automatically based on an analysis of the experience values, manually based on user inputs that occur subsequent to presenting the experience values, and/or based on business goals of the platform, such as to recognize additions to an on-line cart as a business goal that suggests improvements, which is different from a business goal of recognizing an increase in the number of page views.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
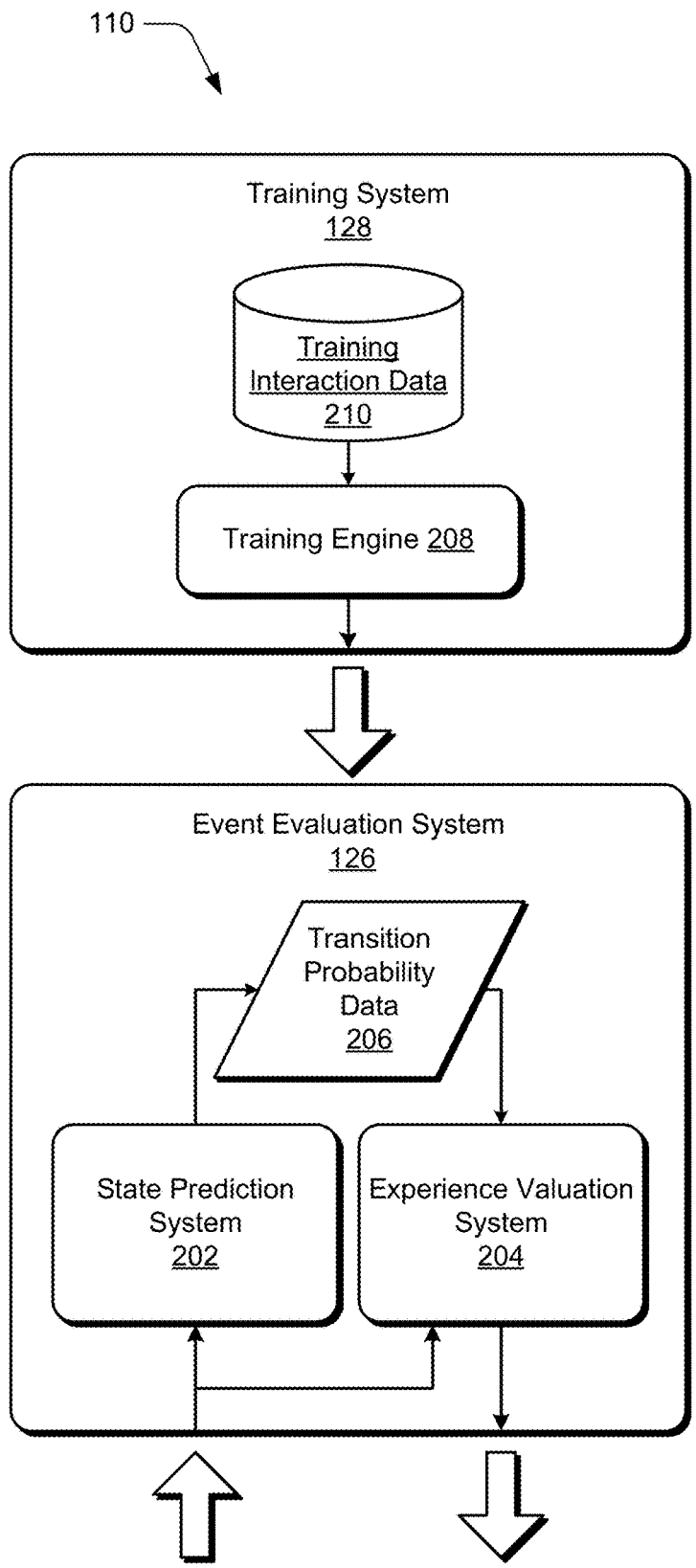
FIG. 2 depicts an example of the event analysis system as shown in FIG. 1 according to the techniques described herein.

FIG. 2 depicts an example of the event analysis system 110, which includes the event evaluation system 126 and the training system 128, in more detail and in accordance with the techniques described herein. For the illustrated example, the event evaluation system 126 includes a state prediction system 202 and an experience valuation system 204. The state prediction system 202 applies a trained next event prediction model to the interaction data received from the host system 108 and generates transition probability data 206 based on the received interaction data. The state prediction system 202 includes program code that implements one or more techniques for computing probabilities of different states. The state prediction system 202 may include one or more neural networks or other machine-learning models having tunable parameters. The parameters are tuned, via a training process, to improve the predictions of next states when the state prediction system is applied to the interaction data.

The state prediction system 202 determines the transition probability data 206 from a particular click state represented by the interaction data to possible next states predicted by the state prediction system. A click state refers to a state of an electronic environment, such as a particular set of functions and content presented to a user at a user interface, based on the most recent action performed by a user device in the electronic environment. A next state refers to a state that is available within the online platform following a particular click state. In one instance, an example of a click state may be a selection of a particular link among multiple displayed links at a user interface, and examples of next states may include insertion of additional query parameters, advancing to a new display screen, returning to a previous display screen, etc.

The experience valuation system 204 applies a trained experience valuation model to the transition probability data 206 provided by the state prediction system 202. The experience valuation system 204 includes program code that implements one or more techniques for determining experience values. The program code may include one or more functions with tunable parameters that apply interaction data to experience valuation functions and rewards in order to determine experience values for an interactive computing environment. The experience valuation system 204 may include one or more neural networks or other machine-learning models having tunable parameters. The parameters are tuned, via a training process, to improve the determination of experience values when the experience valuation system 204 is applied to the interaction data or information based on the interaction data.

The training system 128 includes one or more computing devices that execute one or more training engines 208. A training engine 208 uses training interaction data to train one or more models. The training engine 208 provides these trained models to the event evaluation system 126. Examples of training processes are described in further detail herein. The training interaction data 210 could be, for example, historical interaction data generated in the same manner as the interaction data. A set of the training interaction data 210 may be added to the interaction data subsequent to, or concurrently with, the experience valuation model being applied to the interaction data. The training engine 208 may use the training interaction data 210 in addition to the interaction data to refine one or more aspects of the experience valuation model (e.g., the experience valuation system 204 and/or the state prediction system 202).

Event Collection

Figure 3:
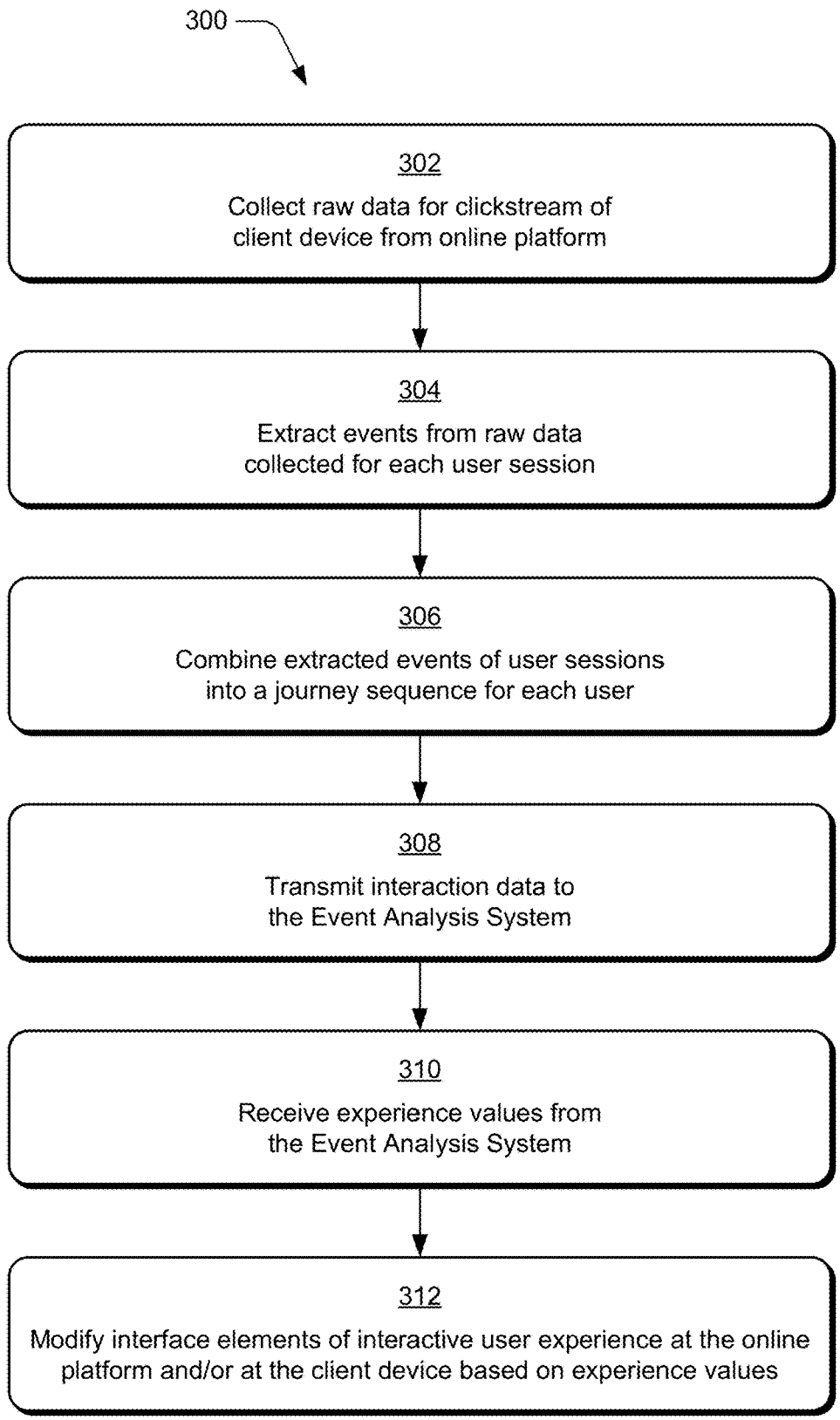
FIG. 3 depicts an example process of the event collection system of FIG. 1 for processing and communicating information between the online platform of the host system and the event evaluation system of the event analysis system according to the techniques described herein.

FIG. 3 depicts an example process 300 of the event collection system 124 shown and described with reference to FIG. 1 for processing and communicating information between the online platform 122 of the host system 108 and the event evaluation system 126 of the event analysis system 110 according to the techniques described herein. The event collection system 124 collects raw data from interaction data, such as a clickstream, of a client device, such as computing device 102 or other device 106, as the client device communicates and interacts with the online platform 122 at block 302. Next, the event collection system 124 extracts events from the raw data collected for each user session at block 304. In order to determine improvements to the interactive computing environment, the user experience evaluation techniques identify beneficial and detrimental events of the environment for each state from the raw data in real-time. The events include, for example, user interactions with the client device, user interactions with the online platform 122, user interactions with a $3^{rd}$ party system via the online platform, system-to-system interactions as a results of user interactions, and any other activity caused by user interactions that may be tracked by the event collection system 124. In this manner, the user experience evaluation techniques may be implemented across multiple sources at an individual action level, regardless of whether actions are grouped into stages or not.

After collecting the raw data of the interaction data and extracting the events, the event collection system 124 may combine or "stitch" the extracted events of user sessions into a journey of sequence for each user at block 306. The interaction data may include one or more journeys, where each journey includes a set of clicks over one or more sessions of the online platform 122. Thus, a journey sequence may represent a discrete path of click states and corresponding states when a client device interacts with the online platform 122.

As a result of collecting interaction data by the event collection system 124, the interactions data is transmitted to the event analysis system 110 or, more specifically, to the event evaluation system 126 and the training system 128, at block 308. The interaction data may be transmitted directly, or in the form of one or more journey sequences if processed by the event collection system 124 at block 306.

In response to transmitting the interaction data, in the form of journey sequences or otherwise, to the event analysis system 110, the host system 108 may receive experience values from the event analysis system at block 310. The time period for receiving the experience values after sending the interaction data may or may not be predetermined, but the experience values received from the event analysis system 110 may be associated with the previously transmitted interaction data. As a result of receiving the experience values, the host system 108 may modify interface elements of interactive user experience at the online platform 122 and/or at the client device (i.e., computing device 102 and/or other devices 106) based on experience values at block 312. The modifications to the interface elements improve the interactive computing environment by addressing issues specific to the online platform 122 and the user interacting with the online platform.

Event Evaluation and Training

Figure 4:
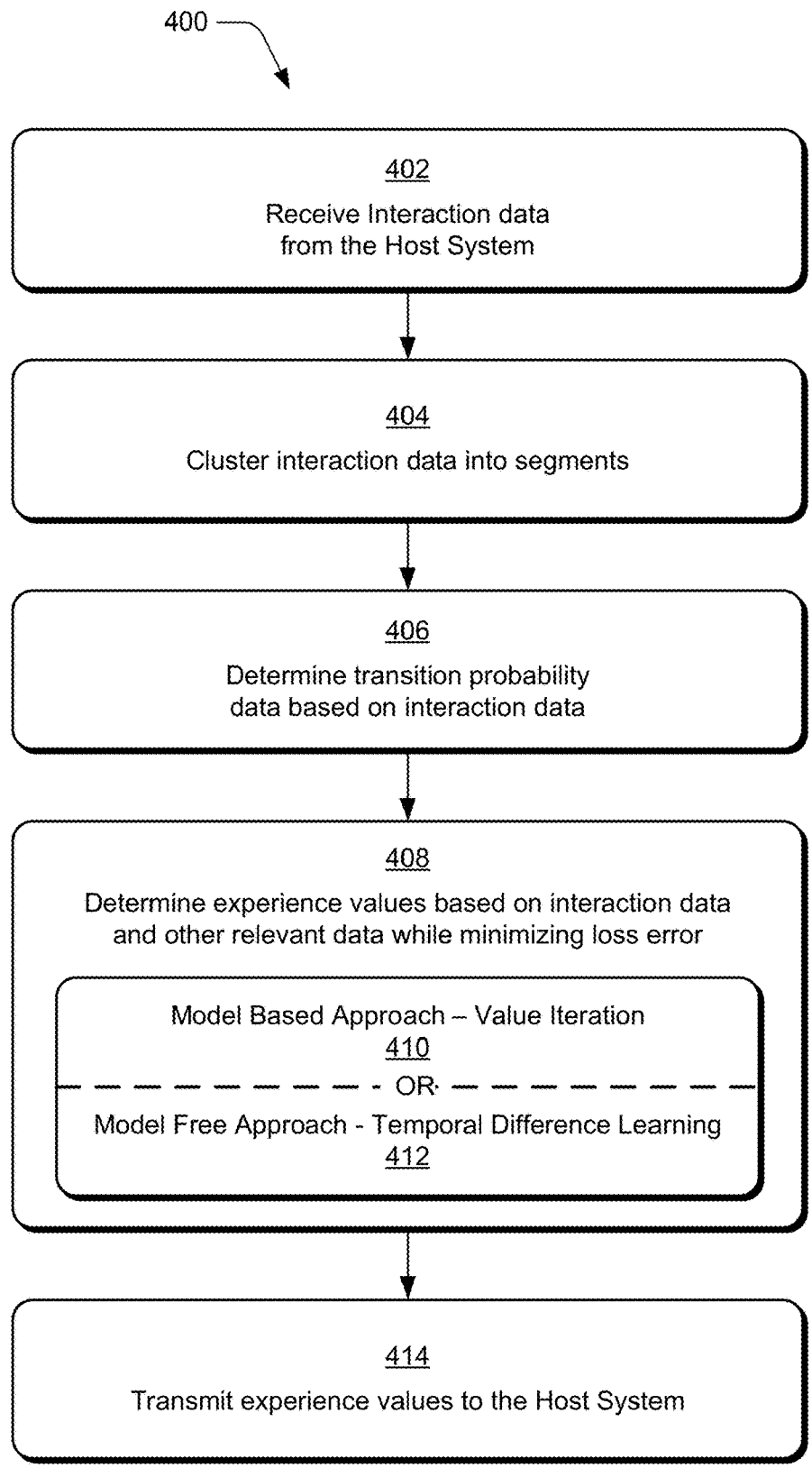
FIG. 4 depicts an example process of the event analysis system of FIGS. 1 and 2 for determining user experience values based on interaction data received from the host system according to the techniques described herein.

FIG. 4 depicts an example process 400 of the event analysis system 110 for determining experience values based on interaction data received from the host system 108 according to the techniques described herein. For the process of determining experience values, the event analysis system 110 receives the interaction data, or journey sequences of the interaction data, for the user session from a remote system, such as the host system 108, at block 402. The quantity of interaction data may be substantial due to the complexity of websites or applications. For that reason, the interaction data and/or journey sequences may be clustered into segments at block 404. By clustering the interaction data, the event evaluation system 126 of the event analysis system 110 may identify how different types of data relate and create new segments based on those relationships.

The state prediction system 202 of the event evaluation system 126 determines transition probability data 206, which is the probability of transitioning from a particular state to a predicted next state. In particular, the state prediction system 202 determines the transition probability data 206 based on the interaction data at block 406, in which the interaction data may be in the form of journey sequences, segments of journey sequences, or the interaction data itself. The state prediction system 202 may determine different probabilities for pairing of the click state to each possible next state. For example, the state prediction system 202 may determine that the transition probability for transitioning from state A to state B may be 40%, from state A to state C may be 50%, and from state A to state D may be 10%.

After the state prediction system 202 determines the transition probability data, the experience valuation system 204 determines experience values based on various information, such as the interaction data received from the host system 108 and an estimation function defined by a set of parameters to model the experience values based on the transition probability data and/or journey sequences at block 408. Also, as represented at block 408, the experience valuation system 204 minimizes loss error by updating parameters of the estimation function based on a reward function and/or the probability transition data. User experience values may be determined by one of two different techniques, namely a model-based approach that utilizes a value iteration model as represented by block 410, and a model-free approach that utilizes temporal difference learning as represented by block 412. Each of these two approaches is described in more detail below in reference to FIGS. 6 and 7. Thereafter, the event analysis system 110 transmits the determined experience values to the host system 108 at block 414.

Figure 5:
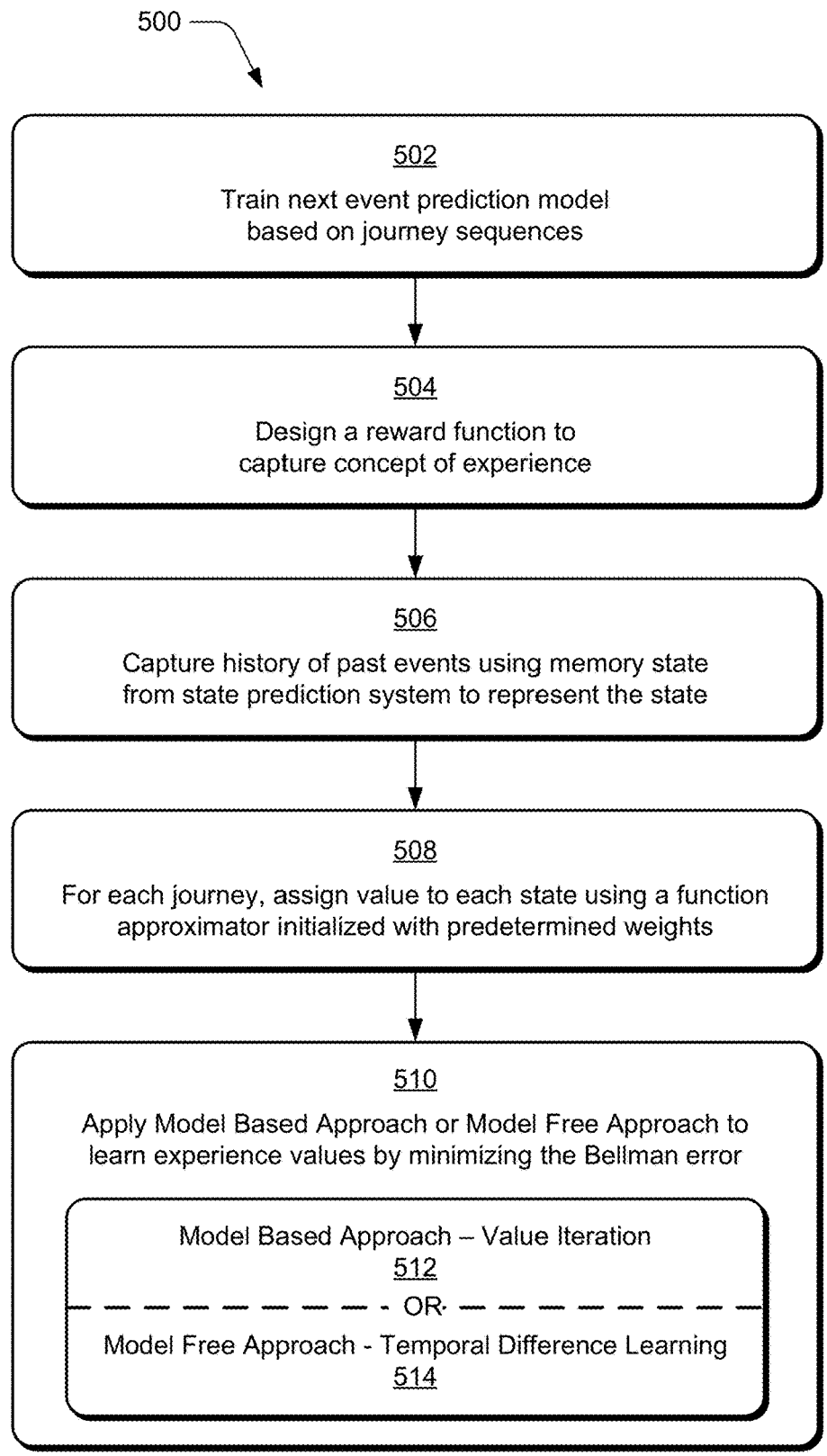
FIG. 5 depicts an example overview process of the event analysis system of FIGS. 1 and 2 for implementing the user experience evaluation techniques described herein.

FIG. 5 depicts an example overview or workflow 500 of the event analysis system 110 of FIG. 1 and FIG. 2 for implementing the user experience evaluation techniques described herein. In contrast to FIG. 4, which illustrates an example process of the event evaluation system 126, FIG. 5 illustrates an example workflow for configuring the event analysis system 110 for the user experience evaluation techniques. Initially, there are two preprocessing matters to be addressed by the host system 108 before proceeding with the first block 502 of the workflow 500. For one preprocessing matter, click actions are extracted from the interaction data along with hit times corresponding to the click actions. For example, in the case of e-commerce, click actions may be associated with selections to proceed to various e-commerce functions including, but not limited to, viewing a cart, accessing customization features, viewing a home screen, viewing a login screen, viewing product information, viewing information about promotions, accessing a search screen, and requesting support. For another preprocessing matter, user sessions are combined or stitched into a journey for each user. The journey of each user includes a set of click actions ordered as a sequence.

Referring to FIG. 5, the workflow 500 of the event analysis system 110 includes various actions for configuring the event analysis system 110 for the user experience evaluation techniques. The state prediction system 202 is trained using a large set of the interaction data and/or journey sequences at block 502. The state prediction system 202 determines next state probability data by applying a trained neural network provided by the training system 128 to the interaction data. For example, the state prediction system 202 may be a recurrent neural network (RNN) with a Long Short Term Memory (LSTM) module that is implemented for the task of next-event prediction. The trained state prediction system 202 predicts a given probability for a given next state based on a history of previous click states represented by the interaction data.

Having trained the state prediction system 202, a reward function is designed to capture the concept of user experience at block 504. User experience may be conceptualized as fulfillment toward a goal in any given workflow, and a user experience value may represent a concept for a given context. For example, for data generated from e-commerce websites, a goal may be defined as making a purchase, and the reward function may be a function of each state or action.

After defining the reward function, the state may be defined in a given context. In particular, a state is defined as the information about the sequence of events that have happened until the current time, i.e., historical events. This information may be captured within the memory state of the recurring neural network (RNN) trained previously as represented by block 502. Thus, to represent the state, a history of past events is captured using a memory state from the state prediction system 202 as represented by block 506. The state prediction system 202 may be a neural network, such as an LSTM, an RNN with an LSTM module, or a different neural network construction, capable of storing a historical sequence of events in previous sessions. Since the psychological state of the user is hidden, the partial observability of the state is handled by using the memory state, such as an LSTM memory state. The historical sequence of events along with the current one is used while recognizing that a single observed event is not sufficient to influence further actions.

To further explain the function of states for the user experience valuation techniques described herein, it would be helpful to understand the framework of the techniques. The browsing behavior of a user 104 of an online platform 122 may be modeled as a first-order Markov process to simulate the dynamics of the interactive computing environment. A Markov decision process is characterized by the tuple <S, A, T, R>. For a stochastic, but stationary, environment with n states, where "S" denotes a finite set of states in the environment, "A" denotes a finite set of actions available in any state. Thus, the transition function T (s, a, s') may represent the probability of transitioning from a state "s" to a next state "s'" after the action "a" has been taken. R (s, a, s') may represent a reward received after transitioning from state "s" to state "s'" due to action "a". The user experience is conceptualized in a decision-making framework as a state value function, where rewards may be formulated to capture the meaning of experience based on the needs of the platform.

A state in the interactive computing environment is represented as a function of a previously observed sequence of events, instead of just the current event. The information from the sequence of events is encoded into a fixed length vector by the hidden cell state of an RNN.

The model of the browsing behavior may be utilized by the state prediction system 202 for determining transition probabilities (e.g., the transition probability data 206) based on encoded information from a historical sequence of events in a hidden cell state. For example, the model may be setup to include a state space represented by $S=\{s_1, s_2, s_3, \ldots\}$ and a reward function represented by $r:S \to \mathbb{R}$, so that a user in state $S_t \in S$ at time t receives a reward $r(S_t)$. Based on this foundation, the transition probability function may be represented by $P(s_i, s_j) = Pr(S_{t+1}=s_j | S_t=s_i)$. The events may be actions or sets of actions, and the sequence of events observed in a user's browsing journey (e.g., a browsing session or set of session) until time t may be represented by $[E_1, E_2, \ldots E_t]$, where $E_i \in \varepsilon = \{e_1, e_2, \ldots e_{|\varepsilon|}\}$. A vector $H_{t-1}$ of d dimensions encodes historical information from the sequence $[E_1, E_2, \ldots E_{t-1}]$. The state at t may be represented as a tuple $S_t=(H_{t-1}, E_t)$. Thus, the relationship between the encoded historical information and the predicted next state may be represented by:

$$S_t \oplus E_{t+1} = S_{t+1}$$

$$(H_{t-1}, E_t) \oplus E_{t+1} = (H_t, E_{t+1})$$

$$(H_{t-1}, E_t) \oplus E_{t+1} = (g(H_{t-1}, E_t), E_{t+1}) \quad (1)$$

The event analysis system 110 simulates the dynamics of the interactive computing environment and applies one or more techniques for exploiting the simulated environment to extract latent experience values. For example, the state prediction system 202 may include a recurrent neural network (RNN) trained to predict the next event in the user's journey. In particular, the state prediction system 202 may include an input layer, an embedding layer, a Long Short-Term Memory (LSTM) layer, and a fully connected output layer. The input layer receives data in the form of sequences of events (i.e., journeys having sets of interaction data). At the embedding layer, the event may be embedded into a latent space of multiple dimensions (e.g., 150 dimensions). The LSTM layer includes multiple hidden dimensions (e.g., 200 dimensions) and acts as the memory unit of the state prediction system 202. The hidden state of the LSTM layer is carried over as input to a future timestep, thus allowing the state prediction system 202 to encode historical information. The output from the LSTM layer is provided to a fully connected output layer (a.k.a., dense layer) of the state prediction system 202. The fully connected output layer produces an output of size $|\varepsilon|$ through, for example, a softmax activation at each time-step of the sequence provided to the input layer. An example of the output for each time-step is a probability distribution vector over multiple possible next events.

Still referring to FIG. 5, the workflow 500 proceeds with determining user experience values after defining the state. A function approximator is used to assign a value to each state for each journey, based on the current state, with respect to the reward function at block 508. The estimation function of the function approximator is initialized with predetermined weights. For example, the estimation function may be randomly initialized, thus generating random user experience values. Thereafter, the values output by the estimation function may be used to determine the expected future rewards based on the user experience values.

The user experience evaluation techniques incorporate domain knowledge in the form of a reward function, r. The reward function includes multiple reward values associated with transitioning from a current state to one or more next states. The rewards may be formulated to capture the meaning of a user experience per the needs of the host system 108, including the online platform 122. The rewards may be formulated in a variety of ways, and example formulations are described below.

For one formulation, the rewards may focus on a goal of a "Purchase" event by a user, and all other events may be assigned a small penalty to reflect a lack of accomplishing the goal of making a purchase.

$$r(S_t) = \begin{cases} 1, & \text{if } E_t = \text{Purchase} \\ -\epsilon, & \text{otherwise} \end{cases} \quad (2)$$

where, $-\epsilon$ represents a small penalty. In other words, for a purchase action, the reward may be assigned is "1" and, for all other states, the reward may be a penalty. Rewards may include significant penalties for certain events considered to be important. Also, it is to be understood that this specific formulation directed to a purchase action does not imply that every user having a goal of purchasing will actually make a purchase. It is expected that the interaction data to be collected will include purchase and non-purchase events.

For another formulation, the rewards may still focus on the "Purchase" goal and the small penalty while adding a negative effect for ending a session before making a purchase.

$$r(S_t) = \begin{cases} 1, & \text{if } E_t = \text{Purchase} \\ -1, & \text{if } E_t = \text{Session end event } i.e. \\ -\epsilon, & \text{otherwise} \end{cases} \quad (3)$$

Rewards may also assign different rewards to different events. For yet another formulation, a different reward may be assigned to each event based on a proximity to the goal, such as a "Purchase" goal, where events considered to be closer to the goal are higher than events considered to be further from the goal.

$$r(S_t) = \begin{cases} 1, & \text{if } E_t = \text{Purchase} \\ 0.8, & \text{if } E_t = \text{Add to Cart} \\ 0.4, & \text{if } E_t = \text{Directed Search} \\ 0.2, & \text{if } E_t = \text{Hedonic Browsing} \end{cases} \quad (4)$$

It should be noted that penalties are not required for reward formulations, such as the formulation above for varying reward levels.

In addition, rewards may be assigned to each stage based on a predetermined function. For example, for still another formulation, the reward may be a function of an engagement level of the user in which the reward may depend on a time spent by the user at the particular stage of the purchasing process.

$$r(S_t) = \begin{cases} -1, & \text{if } E_t = \text{Error} \\ T(S_i), & \text{Otherwise } (T = \text{time spent}) \end{cases} \quad (5)$$

For the formulation above, a penalty may be incurred in case an error occurs at the interface of the interactive computing environment.

As stated above in reference to FIG. 4, the experience valuation system 204 determines user experience values based on various information, such as the interaction data received from the host system 108 and an estimation function defined by a set of parameters to model the experience values, the transition probability data, and/or journey sequences at block 408. Also, as represented at block 510, the experience valuation system 204 minimizes loss error by updating parameters of the estimation function based on a reward function and/or the probability transition data, as may be employed by the model based approach at 512 or the model free approach at 514. The experience values may be determined by one of the two different techniques, namely the model-based approach 512 that utilizes a value iteration model, and the model-free approach 514 that utilizes temporal difference learning. Each of these two approaches is described in more detail below in reference to FIGS. 6 and 7.

Event Prediction

Figure 6:
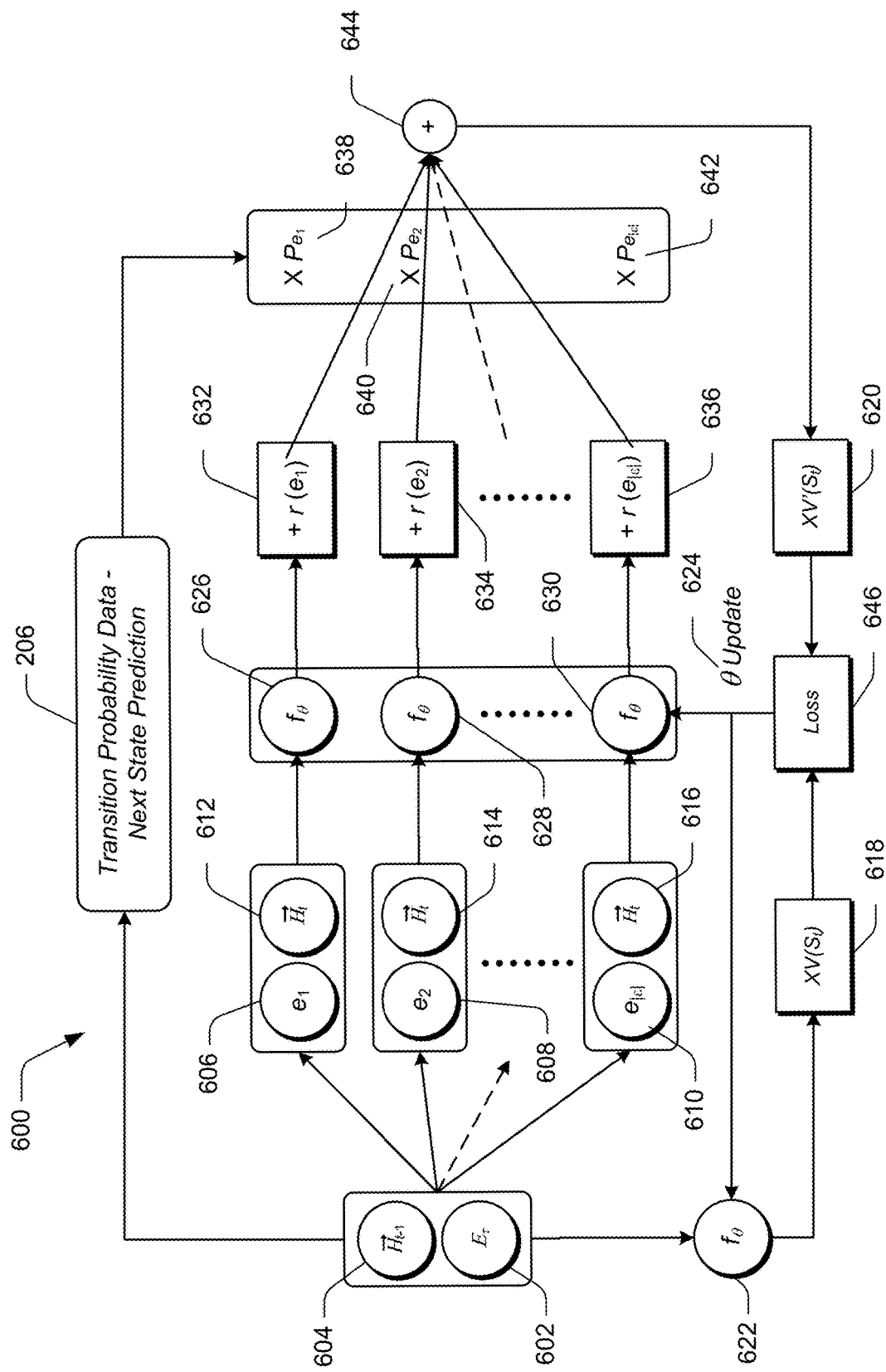
FIG. 6 depicts an example of a model-based approach (as in FIG. 5) of the experience analysis system of FIGS. 1 and 2 for determining user experience values based on interaction data received from the host system according to the techniques described herein.
Figure 7:
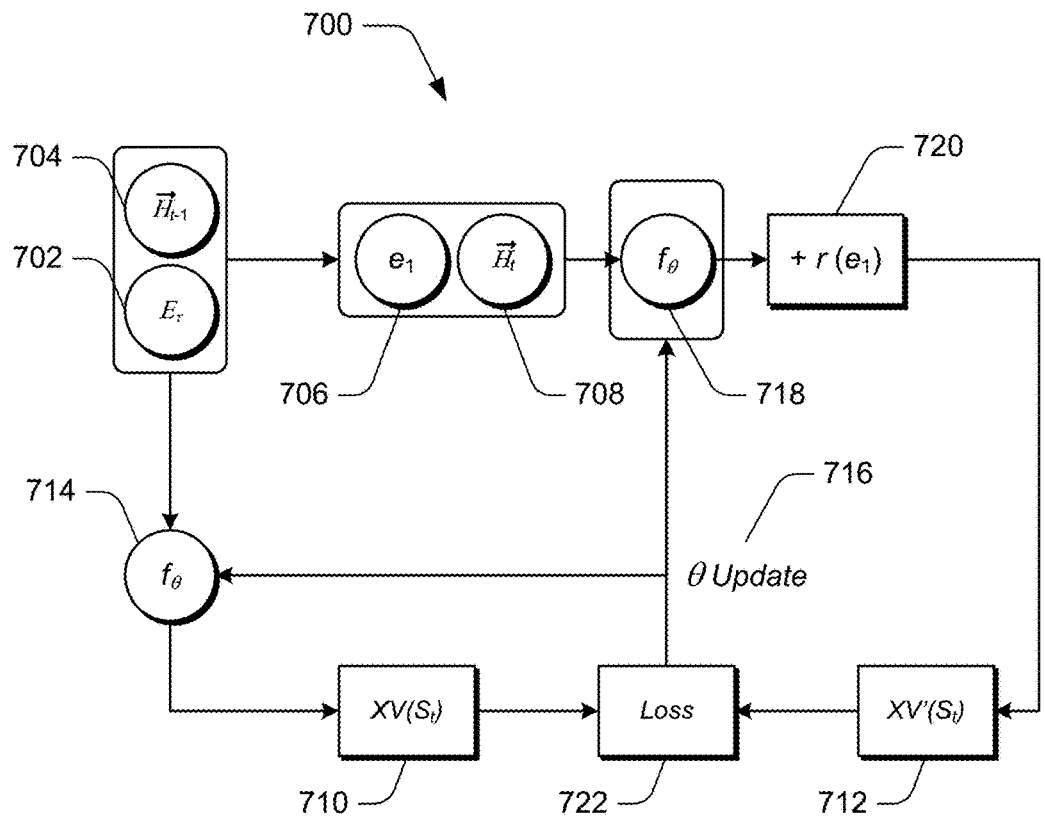
FIG. 7 depicts an example of a model-free approach (as in FIG. 5) of the experience analysis system of FIGS. 1 and 2 for determining user experience values based on interaction data received from the host system according to the techniques described herein.

As stated above, user experience values may be determined by one of two different techniques: a model-based approach that utilizes a value interaction model as represented by FIG. 6, and a model-free approach that utilizes temporal difference learning as represented by FIG. 7. The behavior of users is simulated by learning a model of the environment. For example, a recurrent neural network (RNN) with a long short-term memory (LSTM) module may be used to model the interactive computing environment. Multi-dimensional and continuous historical information may be encoded in the LSTM memory cell along with the current event to characterize states. User experience values may be determined at every action, where rewards and penalties are tied to suitable achievement and non-achievement of goals. For assigning user experience values to all other states, relative to the reward states, the techniques represented by FIGS. 6 and 7 implement a Bellman equation and fixed-point iteration technique. These dynamic programing-based techniques utilize the transition probabilities learned from the pre-trained state prediction system 202 to iteratively improve the estimate of state values. At every iteration, the value of a state is updated to its immediate reward added to the expected sum of values of following states. The techniques converge when the values of all states in subsequent iterations stop changing.

FIG. 6 depicts an example of a model-based approach 600 of the experience analysis system 110 for determining user experience values based on interaction data received from the host system 108. Interaction data for a user session is received from a remote system, and the state prediction system 202 determines probabilities of transitioning from a current state to multiple next states based on the interaction data. A current state 602 and a current historical function 604 for the current state are determined from the interaction data received from the remote system. Multiple predicted next states 606-610 and their corresponding historical functions 612-616 are determined based on the current state 602 and the current historical function 604 of the current state. Specifically, a first predicted next state 606 is presented with a first historical function 612 corresponding to the first predicted next state, a second predicted next state 608 is presented with a second historical function 614 corresponding to the second predicted next state, and a subsequent predicted next state 610 is presented with a subsequent historical function 616 corresponding to the subsequent predicted next state.

For purposes of simplifying the explanation of the user experience evaluation techniques anywhere in this application, including the claims and drawings, it is to be understood that any reference herein to a current state, such as the current state 602, may refer to any data relating to the current state as well as the current state itself. For example, a reference to the current state 602 within this application may be directed to the current state by itself or directed to the current state and any data related to the current state, such as the current historical function 604. Similarly, any reference herein to one or more next states, whether singular or plural, such as predicted next states 606-610, may refer to any data relating to the next states as well as the next states themselves. For example, a reference to the first predicted next state 606 within this application may be directed to the first predicted next state by itself of directed to the first predicted next state and any data related to the first predicted next state, such as the first historical function 612. Any reference to the second predicted next state 608 and the subsequent predicted next state 610 should be interpreted similarly.

The experience valuation system 204 determines an expected experience value 618 and an estimated experience value 620 based on historical information derived from the current historical function 604, the first historical function 612, and various states 606-610. In particular, the experience valuation system 204 determines the expected experience value 618 based on the current state 602 of the interaction data as well as an estimation function 622 defined by a set of parameters 624 to model the user experience values. The experience valuation system 204 also determines an estimated experience value 620 based on the current state 602 as well as the multiple next states 606-610 associated with the current state and the estimation function 626-630. The estimation function 626-630 is applied to each next state of the plurality of next states 606-610 to generate multiple experience values associated with the current state.

The user experience value of any state, $S_t$, may be defined as the total expected discounted reward after time t.

$$XV(S_t) = \mathbb{E}(r(S_{t+1}) + \gamma r(S_{t+2}) + \gamma^2 r(S_{t+3}) + \ldots) \qquad (6)$$

where, $\gamma \in (0, 1)$ is the discounting factor, which represents the discounting of future rewards to the current time. The above expression may be written in the form of a Bellman equation as follows:

$$XV(S_t) = \mathbb{E}(r(S_{t+1}) + \gamma XV(S_{t+1})) \qquad (7)$$

$$XV(S_t) = \sum_{i=1}^{|\varepsilon|} \hat{\mathcal{P}}(S_t, S_t \oplus e_i)(r(S_{t+1}) + \gamma XV(S_{t+1}))$$

The user experience evaluation techniques utilize a functional approximation method to implement the above equation. Although other solutions may be utilized, the state space is very large due to the substantial number of sequence events, so the functional approximation method is effective for solving the above equation for experience values. The experience values are modeled by defining an estimation function $f_\theta$ 622, 626-630 with a set of parameters $\theta$ 624.

$$f_\theta(S_t) = XV(S_t) \triangleq XV(S_t) \qquad (8)$$

Referring again to FIG. 6, the experience valuation system 204 determines the estimated experience value 620 by further considering a reward function 632-636 as described above in reference FIG. 5 and the probabilities of transitioning 638-642 generated by the state prediction system 202. The reward function 632-636 includes multiple reward values associated with transitioning from the current state 602 to the multiple next states 606-610. Each of the reward function 632-636 and the probabilities of transitioning 638-642 provide weighted values for each experience value which, as stated above, is based on each pair of the current state 602 and the next state 606-610 associated with the current state, as well as the estimation function 626-630. A particular reward value of the reward function 632-636 is applied to each experience value. Likewise, the probabilities of transitioning 638-642 is applied to each experience value after application of the reward function 632-636. The experience values associated with the current state are then combined, such as by a summing function 644, after application of the reward function 632-636 and the probabilities of transitioning 638-642.

The set of parameters 624 of the estimation function 622, 626-630 are updated based on a comparison of the expected experience value 618 and the estimated experience value 620. Specifically, a loss 646 achieved with the set of parameters 624 is determined based on the expected experience value 618 and the estimated experience value 620, and the set of parameters is updated to minimize the loss 646.

Parameters $\theta$ 624 may be determined by utilizing a fixed-point iteration method. Parameters $\theta$ 624 are initialized with a random initial value $\theta_0$, and the experience values for all observed states in the training data are then estimated using $\theta^{n-1}$, where n is the iteration number. The Bellman equation is then used to determine the expected values $XV^n$ based on these estimates.

$$XV^n(S_t) = \sum_{i=1}^{|\varepsilon|} \hat{\mathcal{P}}(S_t, S_t \oplus e_i)\left(r(S_{t+1}) + \gamma X\hat{V}^{n-1}(S_{t+1})\right) \qquad (9)$$

The user experience evaluation techniques utilize a loss function to determine a loss 646 quantifying the cost of wrong predictions of the estimation function. The loss 646 between the expected experience value 618 of the current state $(XV^n(S_t))$ and the estimated experience value 620 of the current state $(XV^n(S_t) = f_\theta(S_t))$ is determined and applied to update the parameters $\theta$ 624 and the estimation function $f_\theta$ 622, 626-630. For example, the loss 646 may be determined based on the mean square error $\mathcal{L}_\theta^n$ between the expected experience value 618 of the current state $(XV^n(S_t))$ and the estimated experience value 620 of the current state $(XV^n(S_t) = f_\theta(S_t))$. The mean square error may be used to update the parameters $\theta$ 624 with a gradient descent method until convergence. The gradient descent is an iterative technique for finding the minimum of a loss function. The gradient descent determines the loss 646 achieved with the set of parameters 624 and, then, updates the set of parameters to reduce the loss. The set of parameters 624 are updated in this manner until is minimized, i.e., may not be substantially reduced further. For a training dataset with T timesteps, $$\mathcal{L}_\theta^n = \sum_{k=1}^{K} \sum_{t=1}^{T} (f_\theta(S_t^k) - XV^n(S_t^k))^2 \qquad (10)$$

$$\theta^n = \theta^{n-1} + \alpha \frac{d\mathcal{L}_\theta^n}{d\theta}$$

The user experience values are then transmitted to the remote system. The user experience values include information to facilitate a change to an arrangement of one or more interface elements at the remote system.

FIG. 7 depicts an example of a model-free approach of the experience valuation system of FIG. 2 for determining experience values based on interaction data received from the host system according to the techniques described herein. The model-free approach 700 determines the experience values of the states in a model-free fashion directly from the stream of events. The state values are formalized in a similar way as the model-based approach 600, but updates to the experience values are performed by observing the current transition in the event stream. In contrast, the model-based approach 600 performs updates based on true expectations which require learned transition probabilities. The model-based approach 600 performs well, but a considerable amount of training data is needed in order for the transition model to learn before the experience values may be estimated. The model-free approach 700 is adaptive to new data and requires less training data than the model-based approach. In addition, the model-free approach 700 may estimate the experience values based on temporal-difference learning.

Referring to FIG. 7, a current state 702 and a current historical function 704 for the current state are determined from the interaction data received from a remote system. A predicted next state 706 and a next historical function 708 corresponding to the predicted next state are determined based on the current state 702 and the current historical function 704 of the current state.

As stated above, the explanation of the user experience evaluation techniques is simplified in this application, including the claims and drawings. It is to be understood that any reference herein to a current state, such as the current state 702, may refer to any data relating to the current state as well as the current state itself, such as the current historical function 704. Similarly, any reference herein to one or more next states, such as the next state 706, may refer to any data relating to the next states as well as the next states themselves, such as the next historical function 708.

The experience valuation system 204 determines a current experience value 710 and an estimated experience value 712 based on the current and next states 702, 706. In particular, the experience valuation system 204 determines the current experience value 710 based on the current state 702 of the interaction data as well as an estimation function 714 defined by a set of parameters 716 to model the user experience values. The experience valuation system 204 also determines an estimated experience value 712 based on the current state 702 as well as the next state 706 and the estimation function 718. The estimation function 718 is applied to the next state 706 to generate an experience value associated with the current state.

The experience valuation system 204 determines the estimated experience value 712 by further considering a reward function 720 as described above in reference FIG. 5. The reward function 720 includes multiple reward values associated with transitioning from the current state 702 to the next state 706. The reward function 720 provides weighted values for each experience value which, as stated above, is based on the current state 702 and the next state 706 associated with the current state as well as the estimation function 718. A particular reward value of the reward function 720 is applied to the experience value.

The set of parameters 716 of the estimation function 714, 718 are updated based on a comparison of the current experience value 710 and the estimated experience value 712. Specifically, a loss 722 achieved with the set of parameters 716 is determined based on the current experience value 710 and the estimated experience value 712, and the set of parameters is updated to minimize the loss 722.

The model-free approach 700 for determining experience values may be represented by a Bellman equation, similar to the model-based approach, but the transition probability function, $\hat{P}$, is not included in the equation. The current estimate of the experience value, for a transition from $S_t$ to $S_{t+1}$ and a reward $r(S_{t+1})$, is represented by the following update:

$$XV'(S_t) = r(S_{t+1}) + \gamma XV(S_{t+1})$$

$$TD_t = XV'(S_t) - XV(S_t)$$

$$XV(S_t) = XV(S_t) + \alpha(TD_t) \quad (11)$$

where $XV'(S_t)$ is the estimate of the experience value 712, $\alpha$ is the learning rate, and $\gamma$ is the discounting factor. The experience values are modeled by defining an estimation function $f_\theta$ 714, 718 with a set of parameters $\theta$ 716. The model-free approach determines a temporal-difference (TD) error, which is the difference between the current experience value 710 of the current state $(XV''(S_t))$ and the estimated experience value 712 of the current state $(XV'''(S_t))$. The TD error is used to update the parameters $\theta$ 716 and the estimation function $f_\theta$ 714, 718 of the model-free approach, such that the current experience value 710 of the current state $(XV''(S_t))$ is updated in the direction of the estimated experience value 712 of the current state $(XV'''(S_t))$. After a sufficient number of observations, the estimates converge to a fixed iteration value. The optimal value of the parameters $\theta$ 716 is estimated using the gradient descent method until convergence based on the TD error.

Figure 8:
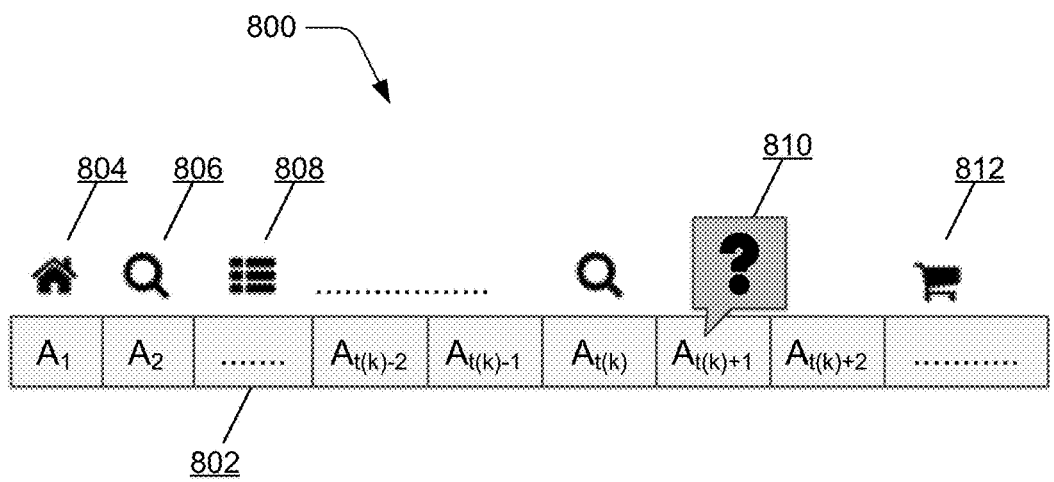
FIG. 8 illustrates an example of clickstream data in the form of sequenced user actions from which proxy ratings that represent survey ratings (without actual surveys being performed, hence termed "surveys without questions") can be developed in accordance with the techniques described herein.

FIG. 8 illustrates an example 800 of clickstream data in the form of sequenced user actions, such as a sequence of actions with survey for k-th customers from which proxy ratings that represent survey ratings (without actually carrying out or performing a survey) can be developed. All of the click actions, for each customer, are stitched together chronologically into a sequence 802 of click actions. For example, a user may start at the home page 804 of a website, initiate a search 806, view product details 808, respond to a pop-up survey 810, add a product to an online shopping cart 812, etc. as a sequence of user actions that are received as clickstream data. The set of unique actions is denoted as $A = \{a_1, a_2, a_{t(k)+2}, \dots\}$. In an e-commerce platform example, a customer may type search words, apply filters, initiate user click actions to view specific product information, and delve further into product details, as well as add a product to an online shopping cart and initiate purchasing the product. On the premise that customers' ratings are best mapped to customers' behaviors (manifested as click actions), the clickstream data provides a useful indication of ratings, from which the proxy ratings can be developed. Given the notion that customers are forward looking, and learn from past and current click actions to choose future click actions, while keeping in mind their eventual goals, customers initiate searches and complete online purchases. This approach may include evaluation of successive sessions, where learned information from one session helps a customer decide whether or where to start browsing during a subsequent session.

As noted above, decision orientation can be modeled based on reinforcement learning (RL), where given a goal and a reward function, the value function of the RL model generates a value of being in a state, for every state, and for every customer. Each state maps to a click action by users, providing values corresponding to every click action, for each customer, given the sequence 802 of click actions in the example 800. The values are interpreted as a proxy rating for each click action, and the proxy ratings are used to identify the click actions that increase or decrease ratings as related to enhancing or hindering the overall user experience. Notably, reinforcement learning (RL) is extended for applicability in the area of customer ratings, with focus on interpretability and insights derived from value functions. The approach also unobtrusively computes proxy ratings of one-hundred percent of the customers, with the proxy ratings being computed for each click action of each customer, resulting in identification of specific interactions that facilitate or impede customer goals. Further, the proxy ratings can be obtained for each session of each customer, allowing observation of customer dynamics over time.

With reference to the sequence 802 of click actions for each customer in the example 800, the k-th customer's sequence of click actions can be defined as $J^{(k)}=[A_1, A_2, \ldots A_m]$ and the proxy rating for action $A_t$ is $y_{A_t}^{(k)}$. The y variable is equal to the computed value XV $(S_t)$ at time t, and the computed value XV is the same as the value "XV" shown and described above with reference to FIGS. 6 and 7. Note that m varies across customers. Consistent with premise that satisfaction and experience ratings are interpreted as a change from expectations, the change of proxy ratings going from one action to the next is used as an indicator of actual ratings. A binary classifier for the proxy ratings is defined, given actions $A_{t-q}$ and $A_t$, a lag(q) change is considered in the proxy ratings from $A_{t-q}$ and $A_t$. An increase in proxy rating is attributed as positive, assigned one (1), and a decrease is attributed as negative, assigned zero (0), as in the following equation:

$$z_{A_{t-q},A_t}^{(k)} = \begin{cases} 1, & \text{if } y_{A_t}^{(k)} - y_{A_{t-q}}^{(k)} > 0 \\ 0, & \text{otherwise} \end{cases} \quad (12)$$

A new metric for ratings is introduced and labeled as Proportion of Good Ratings and is defined as a proportion of all the pairwise, successive actions (that is, q=1) that show an increase in proxy rating values. This is a simple metric and intuitively captures the notion of how often the click actions lead to better ratings. This metric is defined in two ways, $Z^{(k)}$ and $Z(\alpha_u, \alpha_w)$, each with its own purpose. Defined for each customer over a respective journey, $Z^{(k)}$ renders the proportion of the pairwise successive actions that show an increase in proxy ratings. For the k-th customer, the following equation:

$$Z^{(k)} = \frac{1}{|J^{(k)}|-1} \sum_{t=1}^{|J^{(k)}|-1} z_{A_{t-1},A_t}^{(k)} \quad (13)$$

For example, if a customer performs a sequence of twenty (20) click actions, there are nineteen (19) pairwise, successive click actions. If eleven (11) of the pairs indicate an increase in the proxy ratings, then for this k-th customer, the proportion $Z^{(k)}$ is 11/19.

The second proportion, $Z(\alpha_u, \alpha_w)$, is defined for every pair of successive click actions $(\alpha_u, \alpha_w)$ and represents the proportion of all instances of a pair of successive click actions (note, q=1) that show an increase in the proxy ratings. Notably, in the following equation:

$$Z(a_u, a_w) = \frac{1}{N(a_u, a_w)} \sum_{k=1}^{K} \sum_{t=1}^{|J^{(k)}|-1} z_{A_{t-1},A_t}^{(k)} \quad (14)$$

for those t where $A_{t-1}=\alpha_u$ and $A_t=\alpha_w$ and $N(\alpha_u, \alpha_w)$ denotes the number of instances of successive action-pair $(\alpha_u, \alpha_w)$ in the data. Consider pairwise, successive actions $(\alpha_u, \alpha_w)$. If this pair occurs in 1,000 instances with 350 of them showing an increase in the proxy ratings, then the proportion $Z(\alpha_u, \alpha_w)$ is 350/1,000. The same customer can traverse the $(\alpha_u, \alpha_w)$ pair multiple times in a session, where each pair is a single instance, and hence this customer contributes multiple instances to compute $Z(\alpha_u, \alpha_w)$. Therefore, $(\alpha_u, \alpha_w)$=(ProductCategory, ProductDetail). Notably, it is natural for a customer to go back and forth between these two pages at different points across the length of an online session. This natural occurrence is maintained while computing $Z(\alpha_u, \alpha_w)$, instead of using a single average value for this customer across all instances. Use of an average value per customer can tend to lose information on variability across instances within a customer.

Example System and Device

Figure 9:
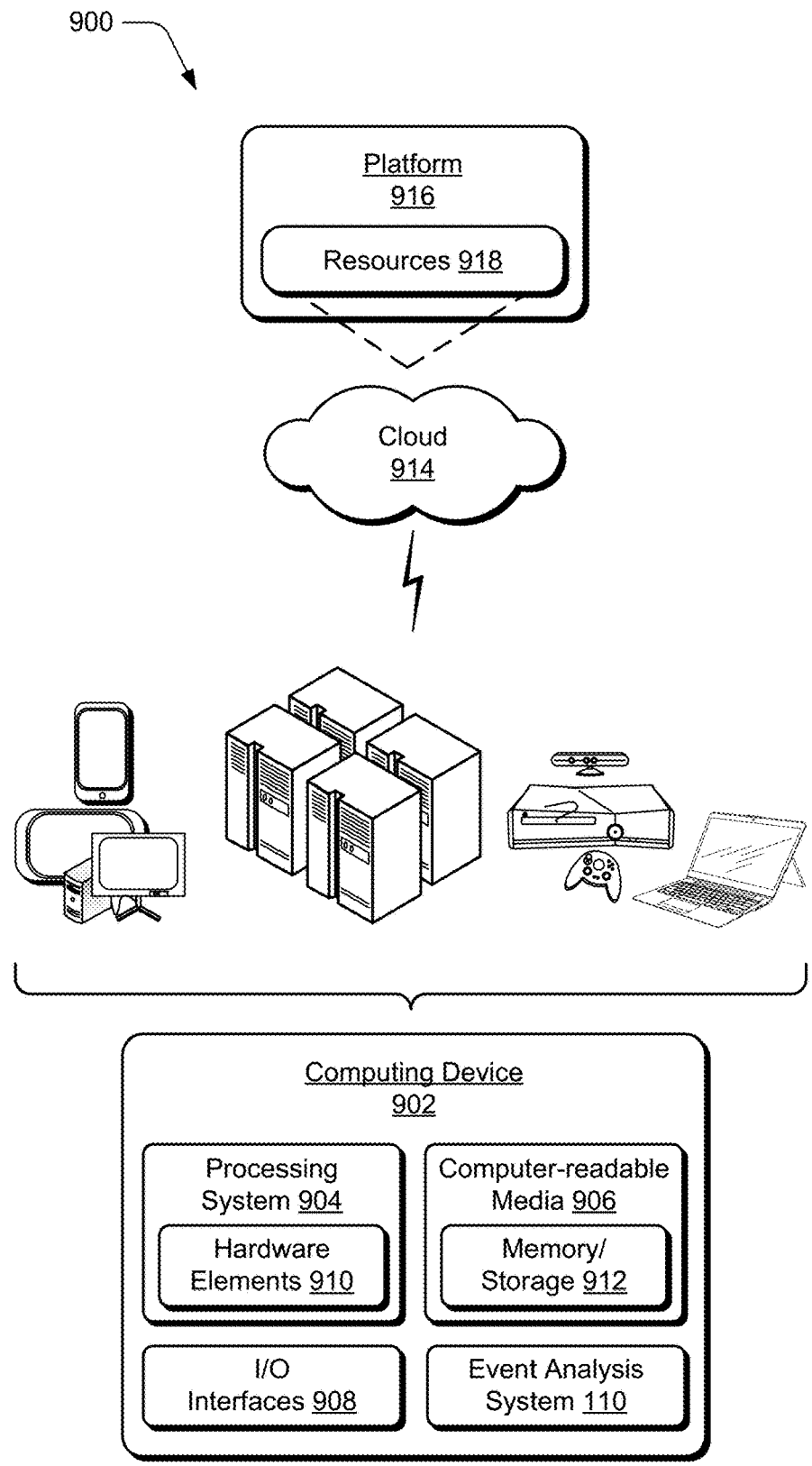
FIG. 9 illustrates an example system including various components of one or more example devices that may be implemented as described and/or utilize with reference to FIGS. 1-8 to implement embodiments of the techniques described herein.

FIG. 9 illustrates an example system 900 that includes an example computing device 902 that is representative of one or more computing systems, such as the host system 108 and the event analysis system 110, and/or one or more devices, such as computing device 102 and other devices 106, that may implement the various techniques described herein. This is illustrated, by example, through inclusion of the event analysis system 110. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable storage media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable storage media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable storage media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Evaluation of User Experience Values

The user experience evaluation techniques for the interactive computing environment described herein have the advantage of determining experienced values based on unsupervised learning of long-view online behaviors without the need for user responses to surveys. The user experience evaluation techniques have the further capability of being compared to user responses to surveys as a final step for the purpose of evaluating the performance of the techniques.

In particular, the following experiment was conducted to evaluate the performance of the user experience evaluation techniques with regard to (a) next action prediction to obtain transition probabilities, (b) value iteration to obtain experience values for each click action of each user, and (c) unsupervised evaluation of the experience values against positive vs. negative experiences as measured by a survey in the final step. As the user experience evaluation techniques were operating for each user session, a survey is provided as a pop-up during each user's browsing session. The survey asked about the user's overall rating for her or his experience during the current session, thus relating well to the measurement of experience by the techniques.

A confusion matrix was created across all respondent users for experience values (i.e., positive and negative) as well as survey scores (i.e., good and poor). Also, the usual metrics were evaluated, including precision, recall, accuracy, F1, etc. Three sets of results were enumerated at the aggregate level for those who responded to the survey. The first result used the sign (negative vs. positive) of the difference between experience values computed from the technique described herein for the action just before the survey appears and that of the prior action. The second result used a similar approach to compare the experience values computed from the technique described herein for the action just before the survey appears and that of the action prior to the prior action. The third result used the average of the first and second results. When reviewing the three results together, the accuracies varied between 0.63 and 0.66, the recall varied between 0.75 and 0.78, the precision varied between 0.7 and 0.71, and the F1 varied between 0.72 and 0.74. A logistic regression of the survey based poor vs good experience on the values of the difference in experience values as computed using this technique yields an AUC of 0.65. These results support the positive performance of the user experience evaluation techniques, particularly in view of the unsupervised approach in modeling and the lack of access to the survey data by the model. In summary, user experience evaluation techniques described herein determined experience values based on readily available user behavior logs without the need for actual survey responses.

Conclusion

Although the invention has been described in language specific to structural features and/or methods, it is to be understood that the invention defined in the appended claims is not necessarily limited to the specific features or methods described. Rather, the specific features and methods are disclosed as example forms of implementing the claimed invention, and other equivalent features and methods are intended to be within the scope of the appended claims. Further, various different examples are described and it is to be appreciated that each described example can be implemented independently or in connection with one or more other described examples.

What is claimed is:

1. In an interactive computing environment characterized by user experience values based on behavior logs, a method implemented by a computing device using a state prediction system and an experience valuation system, the method comprising:

receiving, from a remote system, interaction data for on-line user interactions during sessions browsing online platforms, the interaction data including interactive clickstream data as a chronological sequence of click interactions by a user obtained over multiple user sessions on one or more of the online platforms, the click interactions by the user initiating the remote system to interact with the one or more online platforms, the chronological sequence of the click interactions including a discrete path of click states and corresponding device states of the remote system;

determining, using the state prediction system, probabilities of transitioning from a current state of the interaction data to a plurality of next states based on the interaction data;

training a machine learning model to determine the user experience values, including:

determining, using the machine learning model, an expected experience value based on the current state of the interaction data, the machine learning model defined by a set of parameters to model the user experience values as a representation of a quality of interactive user experience while browsing the one or more online platforms;

determining, using the machine learning model, an estimated experience value based on the current state of the interaction data, the plurality of next states associated with the current state, a plurality of reward values associated with transitioning from the current state to the plurality of next states, and the probabilities of transitioning;

determining a loss achieved with the set of parameters based on the expected experience value and the estimated experience value;

updating the set of parameters of the machine learning model to minimize the loss;

iteratively performing, for a plurality of states of the interaction data and using the updated set of parameters, the determining the expected experience value, the determining the estimated experience value, the determining the loss, and the updating the set of parameters until the estimated experience values for each of the plurality of states converge;

determining, using the experience valuation system, proxy ratings based on the chronological sequence of click interactions and a state value of each click interaction, the proxy ratings representing experience ratings of a user associated with each click interaction based on a proportion of pairwise successive click interactions, where a binary classifier for a proxy rating identifies the click interactions that represent a change as a positive increase or a negative decrease of the user experience values; and transmitting the user experience values to an online platform causing the online platform to automatically rearrange at least one interface element of an online platform interface to a more prominent position in the online platform interface for a subsequent user experience while browsing the online platform, the at least one interface element being associated with a highest user experience value.

2. The method as described in claim 1, wherein receiving the interaction data for the on-line user interactions during the sessions includes receiving the interaction data as a journey sequence of user events extracted from the sessions.

3. The method as described in claim 1, wherein determining the estimated experience value comprises applying the machine learning model to each of the next states to generate a plurality of the user experience values associated with the current state of the interaction data.

4. The method as described in claim 3, wherein determining the estimated experience value further comprises applying a particular reward value of the plurality of reward values to each of the user experience values.

5. The method as described in claim 4, wherein determining the estimated experience value further comprises:
applying the probabilities of transitioning after applying the particular reward value to each of the user experience values; and
summing the plurality of the user experience values associated with the current state after applying the particular reward value to each of the user experience values and after applying the probabilities of transitioning.

6. The method as described in claim 1, wherein the user experience values include information to modify features of the one or more online platforms.

7. The method of claim 1, wherein the set of parameters are initialized with a random initial value.

8. The method of claim 1, wherein the probabilities of transitioning are determined using a recurrent neural network of the state prediction system trained to predict the probabilities of transitioning based on the interaction data, the recurrent neural network predicting the probabilities of transitioning based on a sequence of click interactions by the user leading up to a current state and stored by a long short-term memory layer of the recurrent neural network.

9. The method of claim 1, wherein the proxy ratings are determined using a reinforcement learning model to positively reinforce a proxy rating for the user by the binary classifier based on the positive increase of the user experience values responsive to a set of pairwise successive click interactions.

10. In an interactive computing environment characterized by user experience values based on behavior logs, a method implemented by a computing device using an experience valuation system, the method comprising:
receiving, from a remote system, interaction data for on-line user interactions during sessions browsing online platforms, the interaction data including interactive clickstream data as a chronological sequence of click interactions by a user obtained over multiple user sessions on one or more of the online platforms, the click interactions by the user initiating the remote system to interact with the one or more online platforms, the chronological sequence of the click interactions including a discrete path of click states and corresponding device states of the remote system;
training a machine learning model to determine the user experience values, including:
determining, using the machine learning model, a current experience value based on a current state of the interaction data, the machine learning model defined by a set of parameters to model the user experience values as a representation of a quality of interactive user experience while browsing the one or more online platforms;
determining, using the machine learning model, an estimated experience value based on the current state of the interaction data, a next state associated with the current state, and a reward value associated with transitioning from the current state to the next state;
determining a loss achieved with the set of parameters based on the current experience value and the estimated experience value;
updating the set of parameters of the machine learning model to minimize the loss;
iteratively performing, for a plurality of states of the interaction data, and using the updated set of parameters, the determining the current experience value, the determining the estimated experience value, the determining the loss, and the updating the set of parameters until the estimated experience values for each of the plurality of states converge;
determining proxy ratings based on the chronological sequence of click interactions and a state value of each click interaction, the proxy ratings representing experience ratings of a user associated with each click interaction based on a proportion of pairwise successive click interactions, where a binary classifier for a proxy rating identifies the click interactions that represent a change as a positive increase or a negative decrease of the user experience values; and
transmitting the user experience values to an online platform, causing the online platform to automatically rearrange at least one interface element of an online platform interface to a more prominent position in the online platform interface for a subsequent user experience while browsing the online platform, the at least one interface element being associated with a highest user experience value.

11. The method as described in claim 10, wherein receiving the interaction data for the on-line user interactions during the sessions includes receiving the interaction data as a journey sequence of user events extracted from the sessions.

12. The method as described in claim 10, wherein receiving the interaction data for the on-line user interactions during the sessions includes receiving the interaction data as the chronological sequence of click interactions from which the proxy ratings are associated with the transitioning from the current state to the next state.

13. The method as described in claim 10, wherein determining the estimated experience value comprises applying the machine learning model to each of the next states to generate the user experience values associated with the current state of the interaction data.

14. The method as described in claim 13, wherein determining the estimated experience value further comprises applying a particular reward value of a plurality of reward values to each of the user experience values.

15. The method as described in claim 10, wherein the user experience values include information to modify features of the one or more online platforms.

16. In an interactive computing environment characterized by user experience values based on behavior logs, a computing system comprising:
a state prediction system implemented at least partially in computer hardware, the state prediction system configured to receive, from a remote system, interaction data for on-line user interactions during sessions browsing online platforms, the interaction data including interactive clickstream data as a chronological sequence of click interactions by a user obtained over multiple user sessions on one or more online platforms, the click interactions by the user initiating the remote system to interact with the one or more online platforms, the chronological sequence of the click interactions including a discrete path of click states and corresponding device states of the remote system;

an experience valuation system implemented at least partially in the computer hardware, the experience valuation system configured to:

determine, using a machine learning model, a current experience value based on a current state of the interaction data, the machine learning model defined by a set of parameters to model the user experience values as a representation of a quality of interactive user experience while browsing the one or more online platforms;

determine, using the machine learning model, an estimated experience value based on the current state of the interaction data, a next state associated with the current state, and a reward value associated with transitioning from the current state to the next state;

determine a loss achieved with the set of parameters based on the current experience value and the estimated experience value;

update the set of parameters of the machine learning model to minimize the loss;

iteratively perform, for a plurality of states of the interaction data, and using the updated set of parameters, the determination of the current experience value, the determination of the estimated experience value, the determination of the loss, and the update to the set of parameters until the estimated experience values for each of the plurality of states converge; and determine proxy ratings based on the chronological sequence of click interactions and a state value of each click interaction, the proxy ratings representing experience ratings of a user associated with each click interaction based on a proportion of pairwise successive click interactions, where a binary classifier for a proxy rating identifies the click interactions that represent a change as a positive increase or a negative decrease of the user experience values; and transmit the user experience values to an online platform causing the online platform to automatically rearrange at least one interface element of an online platform interface to a more prominent position in the online platform interface for a user experience browsing the online platform of the interactive computing environment, the at least one interface element being associated with a highest user experience value.

17. The computing system as described in claim 16, wherein:

the state prediction system is configured to determine probabilities of transitioning from the current state of the interaction data to a plurality of next states based on the interaction data, the plurality of next states including the next state associated with the current state; and the experience valuation system is further configured to determine the estimated experience value based further on the probabilities of transitioning, in addition to the current state, the next state, and the reward value.

18. The computing system as described in claim 16, wherein the interaction data includes a journey sequence of user events extracted from the sessions.

19. The computing system as described in claim 16, wherein the experience valuation system is further configured to apply the machine learning model to each of the next states to generate the user experience values associated with the current state of the interaction data.

20. The computing system as described in claim 19, wherein the experience valuation system is further configured to apply a particular reward value of a plurality of reward values to each of the user experience values.

* * * * *